(12) United States Patent
Kuzma

(10) Patent No.: US 6,776,493 B1
(45) Date of Patent: Aug. 17, 2004

(54) TUNABLE OPTICAL DISPERSION COMPENSATOR

(75) Inventor: Andrew J. Kuzma, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 45 days.

(21) Appl. No.: 10/126,106

(22) Filed: Apr. 17, 2002

(51) Int. Cl.[7] .................................................. G02B 5/04
(52) U.S. Cl. ........................ 359/615; 398/147; 398/159
(58) Field of Search .................. 359/615; 398/147–149, 398/159; 372/25

(56) References Cited

U.S. PATENT DOCUMENTS

| | | | |
|---|---|---|---|
| 4,478,482 A | * 10/1984 | Koester | 359/201 |
| 5,969,865 A | * 10/1999 | Shirasaki | 359/577 |
| 6,327,068 B1 | * 12/2001 | Silberberg et al. | 359/239 |
| 6,493,488 B1 | * 12/2002 | Islam et al. | 385/47 |
| 2003/0002772 A1 | * 1/2003 | Katayama et al. | 385/15 |

* cited by examiner

Primary Examiner—Mark A. Robinson
Assistant Examiner—Alessandro Amari
(74) Attorney, Agent, or Firm—Blakely, Sokoloff, Taylor & Zafman LLP

(57) ABSTRACT

A tunable optical dispersion compensator may direct a light beam onto a first optical component such as a diffraction grating to separate the light beam into discrete spatial elements. A first lens may image the spatial elements to effect a Fourier transform at a shaped phase optical structure where unwanted phase shifts between the spatial elements are compensated by changing time delays between the elements. An inverse Fourier transform may be performed on the compensated spatial elements to reconstruct a light beam for return to a fiber optical network.

25 Claims, 3 Drawing Sheets

TUNABLE OPTICAL DISPERSION COMPENSATOR

TECHNICAL FIELD

This disclosure relates generally to optical communications, and in particular but not exclusively, relates to a dispersion compensator that can be used in an optical communications network.

BACKGROUND

Fiber-optic networks are increasingly being used in many industries, most notably telecommunications and computer networks. Transmission speeds and distances can at times, however, be limited based on various factors. One of these factors is chromatic dispersion, which occurs when a pulse of light traveling down an optical fiber broadens.

Such pulse broadening typically occurs as different wavelength components or colors within the pulse move at different speeds along the fiber, with the shorter wavelength components traveling faster than the longer wavelength components. Thus, a pulse may broaden and ultimately may overlap with another pulse, thereby distorting the data in a signal. This effect may become increasingly pronounced at high bit rates, as additional factors may contribute to chromatic dispersion (e.g., temperature, humidity, aging, and stress of the fiber).

In an effort to reduce chromatic dispersion and allow for longer transmission distances and greater throughput of data, several techniques are used. One technique is to use a dispersion compensating fiber (DCF) that can introduce negative dispersion over relatively short distances, thereby offsetting positive dispersion accumulated by the pulse traveling through the fiber. However, each portion of fiber generally requires a unique length of DCF in order to provide a correct amount of compensation. As such, DCFs are not readily tunable as changing properties of a DCF often requires changing the DCF itself, which is a process that can be time-consuming and inefficient.

Another technique includes the use of dispersion compensation gratings. One type of grating is a chirped in-fiber Bragg grating, which reflects each wavelength component at different points to compensate a dispersed pulse. Like DCFs, however, the amount of dispersion compensation provided cannot be adjusted easily. Moreover, the gratings may sometimes over-compensate or under-compensate at certain frequencies.

Accordingly, chromatic dispersion reduces the efficiency of fiber optic networks by limiting transmission distances and throughput of data. Known methods to solve this problem such as use of DCF and dispersion gratings, may have drawbacks, such as not being easily adjusted and/or not providing a suitable compensation amount.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of a system and method for a tunable optical dispersion compensator are described herein. In the following description, numerous specific details are provided, such as graphs in FIGS. 1 and 2 to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, an embodiment of the invention provides a tunable optical chromatic dispersion compensator. The device directs a light beam onto a first optical component to separate the light beam into discrete spatial elements. The discrete spatial elements are then imaged or otherwise directed by a first lens to create a Fourier transform at a shaped phase optical structure, such as a micromembrane mirror, where unwanted phase shifts between the spatial elements are corrected. In order to reconstruct the corrected spatial elements back into a light beam for return to the fiber optic network, a reverse Fourier transform is then performed using a second lens and a second optical component.

Figure 1:
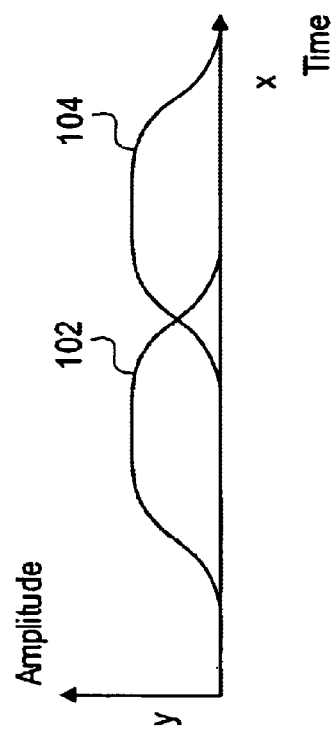
FIG. 1 is a graph illustrating example effects of dispersed pulses.

FIG. 1 is a graph illustrating example dispersed signals or light pulses 102 and 104, which have accumulated unwanted phase shifts as a result of chromatic dispersion. Such phase shifts may occur as different wavelength components of each pulse travel at different speeds through an optical fiber. For example, shorter wavelengths (e.g., such as represented by a color blue) may travel faster than longer wavelengths (e.g., such as represented by a color red). In the graph, a y-axis represents amplitude and an x-axis represents time. The graph illustrates that the pulse 102 has broadened in the time domain, overlapping with the adjacent pulse 104 which has also broadened. Such an overlap may make it difficult for an optical receiver to distinguish between the pulses 102 and 104. It should be noted that "light" as discussed in the following descriptions may include not only visible light but also light of other frequency ranges, such as infrared light, ultraviolet light, and the like.

Figure 2:
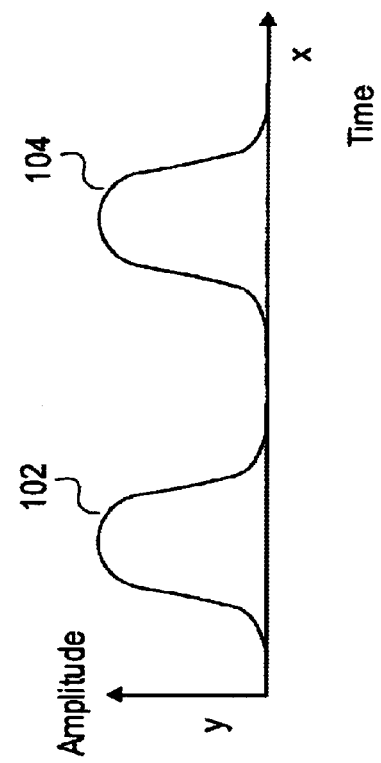
FIG. 2 is a graph illustrating the pulses of FIG. 1 after compensation in accordance with an embodiment of the invention.

Note that dispersion compensation is often needed for long lengths of fiber and high rates of data transmission in a high speed optical network. As a result, for example, at 40 Gigabits per second, variable factors such as temperature, humidity, aging and stress of the fiber, may need to be considered since these factors contribute to dispersion. FIG. 2 illustrates the pulses 102 and 104 after compensation in accordance with one embodiment of the invention. The pulses 102 and 104 appear clearly separated as a result of the compensation and a more successful decoding of data at the optical receiver can occur. In one embodiment, the pulses 102 and 104 are reduced in broadness and increased in amplitude via the compensation.

Figure 3:
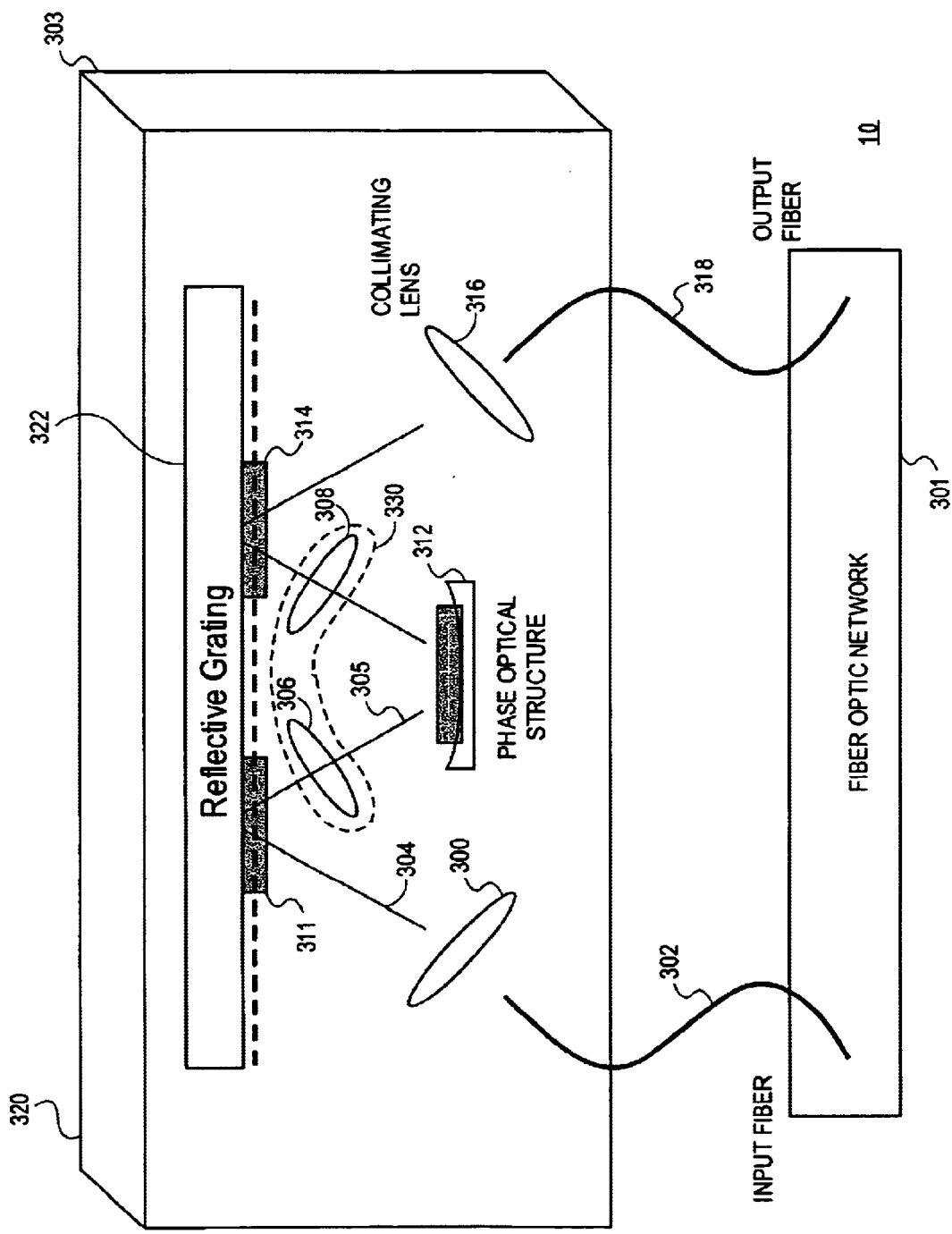
FIG. 3 is a diagram illustrating an example embodiment of the invention that provides dispersion compensation.

FIG. 3 illustrates a system 320 for performing compensation. The elements of the system 320 may be located in an optical cavity 303, where, according to embodiment, an input fiber 302 may receive a dispersed light beam from an optical network 301. A first collimating lens 300 may be positioned to collimate and direct the light beam from the input fiber 302. Thus, the first collimating lens 300 can manipulate the light beam to obtain a parallel or non-diverging light beam that may continue along a path 304.

A first optical component 311 may subsequently redirect and separate the collimated light beam into discrete spatial elements. In an embodiment, the first optical component 311 may comprise a diffraction grating or other component suitable to transform a light beam into discrete spatial elements. In an embodiment, such a diffraction grating may be capable to diffract a light beam in two dimensions. In addition, it is appreciated that methods other than use of the collimating lens 300 to collimate the light beam may be used. For example, in an embodiment, a curved diffraction grating may be used to collimate the incoming light beam.

In an embodiment, a reflective grating 322 may be placed adjacent to the first optical element 311 to reflect the discrete spatial elements diffracted from the first optical element 311. Such reflection may be performed to provide compactness by folding the path 304 traveled by the light. In other embodiments, the first optical component 311 need not be accompanied by the reflective grating 322, and may instead directly diffract the light to a transform lens 306.

In an embodiment, after the light beam is separated, the transform lens 306 may image or otherwise direct the discrete spatial elements from the first optical component 311 to effect a Fourier transform of the light beam at a phase optical structure 312. In other words, the spatial elements may be directed along a path 305 from the first optical component 311 through the transform lens 306 to the phase optical structure 312. The first optical component 311 may be located at a front or first focal plane of the transform lens 306 with the phase optical structure 312 located at a back or second focal plane according to an embodiment of the invention.

In an embodiment, the phase optical structure 312 may comprise a dynamically deformable curved mirror. For example, in an embodiment, the deformable curved mirror can comprise a microelectromechanical system (MEMS) micromembrane mirror. It is also appreciated that in another embodiment, the curved mirror may have a static form, rather than being dynamically deformable.

The phase optical structure 312 may be shaped or selectively deformed to compensate for phase shifts (e.g., time delays) of the spatial elements diffracted from the first optical component 311. When the light beam meets the phase optical structure 312, time delays between its spatial elements may be changed, allowing the correct phase relationships to emerge. Such compensation time delays may be introduced as individual spatial elements may be received and redirected from the optical phase structure 312 at different points of its curvature, altering an optical distance that each spatial element may travel. The curvature of the phase optical structure 312 can be designed or otherwise deformed to provide the proper amount of compensation, based on known dispersion characteristics of light as it travels over a certain distance of optical fiber 302.

In an embodiment, the phase optical structure 312 can include a perimeter that includes a circular or other shape such that the spatial elements may be reflected in dimensions to correct a polarization dispersion of the light beam as well. A grating in one-direction creates spatial frequencies in one dimension. Polarization dispersion occurs when light polarized in one direction has a phase shift relative to light polarized in the other direction. This may be caused by the fiber core not being made in a symmetric manner, or by a mechanical force causing the fiber core to be shaped in an asymmetric manner. In order to compensate for polarization dispersion, phase optical structure 312 may be independently manipulated in two spatial dimensions in one embodiment of the present invention. A technique to achieve this is to project light onto a two-dimensional grating and manipulate the two-dimensional Fourier spatial components. In an embodiment, phase optical structure 312 includes a circular membrane or other suitable device to provide this function in accordance with the teachings of the present invention.

According to an embodiment of the invention, the light is then directed from the phase optical structure 312 to an inverse transform lens 308. The lens 308 may be located between the phase optical structure 312 and a second optical component 314, separated from each by a focal distance of the inverse transform lens 308. In an embodiment, the compensated spatial elements may be directed by the inverse transform lens 308 from the phase optical structure 312 to the second optical component 314 to effect an inverse Fourier transform of the spatial elements. It is appreciated that, in an embodiment, the transform lens 306 and inverse transform lens 308 may comprise lenses well-known in the art of Fourier optics and capable to effect a Fourier transformation of light. In an embodiment, the transform lens 306 and the inverse transform lens 308 may include separate lenses as depicted in FIG. 3. In another embodiment, the transform lens 306 and the inverse transform lens 308 may include a single lens 330.

Additionally, in an embodiment, the second optical component 314 may comprise a reconstruction grating or other suitable device to reconstruct discrete spatial elements into a continuous light beam. In an embodiment, the first optical component 311 and the second optical component 314 may comprise two individual diffraction gratings. In another embodiment, the first optical component 311 and the second optical component 314 may comprise a single diffraction grating.

In one embodiment, the same grating and lens may be used in a "folded" optical configuration. Input light and output light may be offset slightly, but since the light generally does not interact with itself, the light can be bounced off sections or areas of the grating that are very close to each other. Such an embodiment may have the advantages of less space and more uniform results since the grating may be smaller.

At the second optical component 314, the compensated spatial elements having corrected phase shifts may be received and reconstructed into a light beam. The reconstructed light beam may then be directed by the second optical component 314 and/or the reflective grating 322 to a second collimating lens 316 to focus the light beam to an output fiber 318. According to an embodiment of the invention, the output fiber 318 may be coupled to the optical network 301, where the light beam may travel through segments of the network 301 to eventually reach an optical receiver (not shown).

In an embodiment, the system 320 may be disposed at various locations along the transmission path, such as at hubs or repeater stations. In another embodiment, the system 320 may be disposed at an optical receiver and/or transmitter. For instance, if the system 320 is located at an optical transmitter, the phase optical structure 312 can provide pre-dispersion time delays of the spatial elements, thereby compensating for dispersion in advance in a manner that the spatial elements have reduced dispersion by the time they reach a specific point in the transmission path.

It is appreciated that in an embodiment, the invention may be used with dense wavelength division multiplexing (DWDM) technology. For example, in an embodiment, L-band ("long") and C-band ("conventional") signals traveling on the same fiber can be compensated by utilizing a beam splitter to divert the light beam to two different devices. Thus, the L-band signal may be diverted to a first phase optical structure and the C-band signal may be diverted to a second phase optical structure, with each structure being tuned to a particular band.

Figure 4:
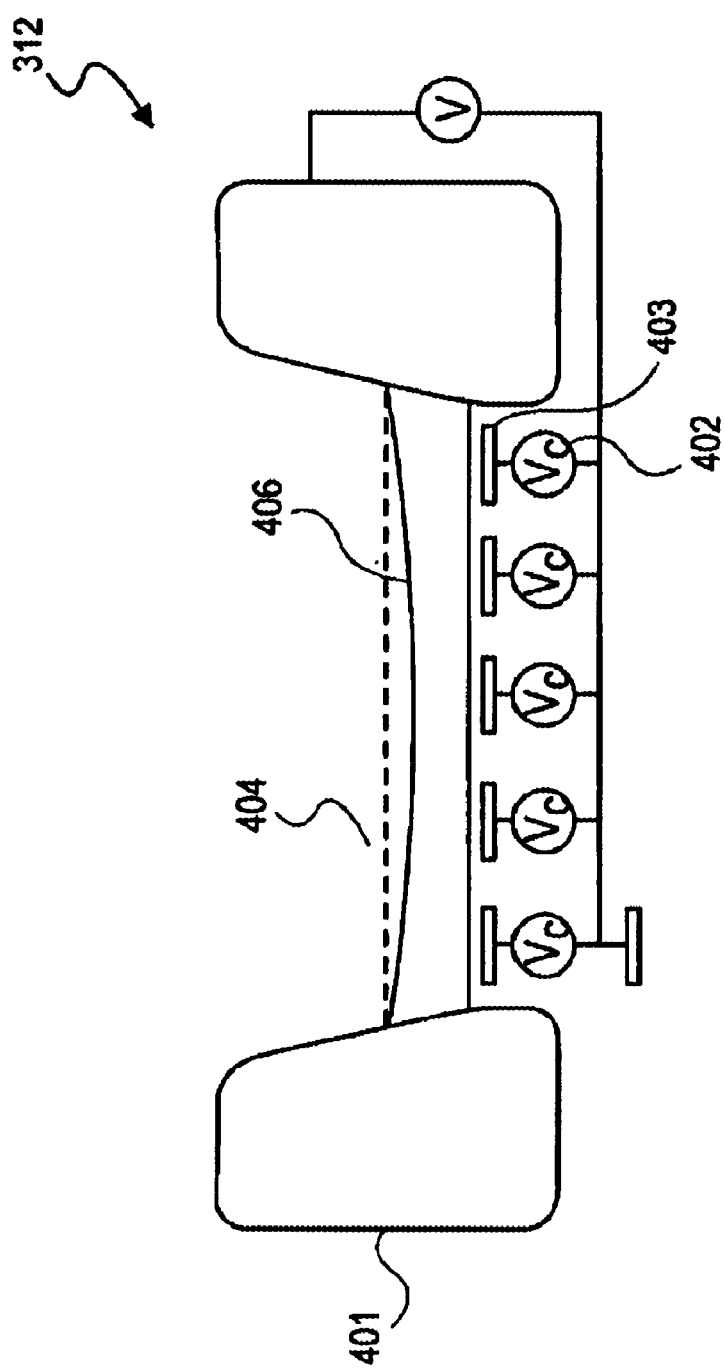
FIG. 4 is an example of a deformable mirror that can be used for dispersion compensation in accordance with an embodiment of the invention.

FIG. 4 is an illustration of an embodiment of the phase optical structure 312 in accordance with the teachings of the present invention. In the illustrated embodiment, the phase optical structure 312 of FIG. 4 may be implemented via a deformable mirror, such as a MEMS micromembrane mirror. It is appreciated that although the MEMS micromembrane mirror is shown here, other suitably reflective structures capable to alter a phase relationship among wavelength components may be used in other embodiments. In an embodiment shown in FIG. 4, a surface or membrane 406 with a reflective coating may be suspended above electrodes 403. The membrane 406 may be comprised of a thin silicon-type material and the coating may comprise a suitable metal that may be highly reflective (e.g., aluminum or gold) in an embodiment. A support 401 for the membrane 406 can be comprised of silicon, and can be produced by silicon micromachining, for example.

In an embodiment of the invention, electrodes 403 may be disposed proximate to or positioned under the membrane 406 on which voltages, represented by Vc 402, can be applied. Varying the voltages 402 on the different electrodes 403 can cause electrostatic forces to induce a curvature in portions of the membrane 406 and enable a shape of the membrane 406 to be adjusted or deformed based on the amount of applied voltage.

Note that without any applied voltages (or with all voltages 402 at the same level), the membrane 406 may form along a flat plane, as shown by a dotted line 404. Furthermore, as mentioned above, although the phase optical structure 312 has been described in an embodiment as a micromembrane mirror, other suitable structures for altering a phase of a wavelength component of light may be used. For instance, in other embodiments, a spatial light modulator may be used.

Thus, the membrane 406 can be shaped to tunably vary optical distances to be traveled by the discrete spatial elements before they are reconstructed into a another light beam. The amount of adjustment can be determined by a person skilled in the art based on information about expected chromatic dispersion for particular fibers. For example, fiber dispersion curves may provide an amount of phase shift expected for a given frequency of light traveling on a given length and type of fiber. Based on these factors and based on the other factors that may vary the phase shift in any given situation, the voltages 402 can be dynamically adjusted in response to (e.g., feedback with respect to) the potentially dynamic nature of the dispersion.

In conclusion, an embodiment of the invention provides a tunable optical chromatic dispersion compensator. The system 320 directs a dispersed light beam received from a fiber optic network 301 onto a first optical component 311, such as a diffraction grating, to separate the light beam into discrete spatial elements. In an embodiment, the discrete spatial elements are then imaged by a first lens 306 to effect a Fourier transform at a shaped phase optical structure 312, such as a tunable micromembrane mirror, where unwanted phase shifts between the spatial elements are corrected. In order to reconstruct the spatial elements back into a light beam for return to the fiber optic network 301, a reverse Fourier transform is then performed using a second lens 308 and a second optical component 314.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
   a first optical component to separate a light beam into spatial elements;
   a first lens positioned to receive the spatial elements from the first optical component and to effect a Fourier transform of the spatial elements;
   a reflective phase optical structure positioned to receive and to reflect the Fourier transform of the spatial elements, the reflective phase optical structure being shaped to compensate for phase shifts between the spatial elements;
   a second lens positioned to receive the reflected Fourier transform of the spatial elements having the phase shifts compensated by the reflective phase optical structure and to effect an inverse Fourier transform; and
   a second optical component to receive the spatial elements having the phase shifts compensated by the phase optical structure, the second optical element being capable to reconstruct the spatial elements having the compensated phase shifts into another light beam.

2. The apparatus of claim 1 wherein the first and the second lens comprise a single lens.

3. The apparatus of claim 1 wherein the first optical component is located at a front focal plane of the first lens and the reflective phase optical structure is located at a back focal plane of the first lens.

4. The apparatus of claim 3 wherein the phase optical structure is located at a front focal plane of the second lens and the second optical component is located at a back focal plane of the second lens.

5. The apparatus of claim 1 wherein the first and the second optical components comprise diffraction gratings.

6. The apparatus of claim 1 wherein the reflective phase optical structure comprises a curved mirror.

7. The apparatus of claim 6 wherein the reflective phase optical structure comprises a deformable mirror.

8. The apparatus of claim 1 wherein the reflective phase optical structure comprises a microelectomechanical system (MEMS) micromembrane mirror.

9. The apparatus of claim 8 wherein an application of a voltage to the reflective phase optical structure selectively deforms portions of a surface of the MEMS mirror to alter a distance traveled by the spatial elements.

10. The apparatus of claim 1, further comprising a first collimating lens and a second collimating lens, the first collimating lens positioned to collimate and direct an incoming light beam to the first optical component, the second collimating lens positioned to collimate another light beam.

11. An apparatus, comprising:
- a diffraction grating to separate a first light beam into discrete spatial elements;
- a transform lens located to receive and effect a Fourier transform of the discrete spatial elements separated by the diffraction grating;
- a phase optical structure with a reflective surface to receive the Fourier transform of the discrete spatial elements, the phase optical structure being shaped to compensate for phase shifts between the discrete spatial elements; and
- a reconstruction grating to receive the discrete spatial elements and to combine the discrete spatial elements into a second light beam.

12. The apparatus of claim 11 wherein the transform lens is located one focal length away from the the phase optical structure.

13. The apparatus of claim 12 further comprising an inverse transform lens located relative to the phase optical structure and the reconstruction grating to effect an inverse Fourier transformation of the discrete spatial elements into the second light beam.

14. The apparatus of claim 11 wherein the diffraction grating and the reconstruction grating comprise a single grating.

15. The apparatus of claim 11 wherein the diffraction grating and the transform lens perform a two-dimensional Fourier transform.

16. The apparatus of claim 15 wherein the phase optical structure is deformable in multiple dimensions.

17. The apparatus of claim 15 wherein the phase optical structure compensates for polarization dispersion.

18. The apparatus of claim 11 wherein the diffraction grating and the reconstruction grating are two-dimensional, the diffraction grating and reconstruction grating to create spatial frequencies in two dimensions.

19. A method, comprising:
- separating a light beam into discrete spatial elements;
- Fourier transforming the discrete spatial elements;
- correcting phase shifts of the Fourier transform of the discrete spatial elements by selectively altering a distance traveled by the discrete spatial elements using a reflective surface to change time delays between the discrete spatial elements; and
- reconstructing the discrete spatial elements having the corrected phase shifts into another light beam.

20. The method of claim 19 wherein correcting phase shifts of the discrete spatial elements comprises changing a curvature of the reflective surface that receives the discrete spatial elements.

21. The method of claim 20 wherein changing the curvature of the reflective surface that receives the discrete spatial elements includes applying voltages to electrodes disposed proximate to the reflective surface to induce the curvature of the surface.

22. A system, comprising:
- an optical network; and
- at least one tunable optical chromatic dispersion compensator to receive a light beam from the optical network, the tunable dispersion compensator comprising:
  - a first optical component to separate the light beam into spatial elements;
  - a first lens positioned to receive the spatial elements from the first optical component and to effect a Fourier transform of the spatial elements;
  - a reflective phase optical structure positioned to receive and to reflect the Fourier transform of the spatial elements, the reflective phase optical structure being shaped to compensate for phase shifts between the spatial elements;
  - a second lens positioned to receive the reflected Fourier transform of the spatial elements having the phase shifts compensated by the reflective phase optical structure and to effect an inverse Fourier transform; and
  - a second optical component to receive the spatial elements having the phase shifts compensated by the phase optical structure, the second optical element to reconstruct the spatial elements having the compensated phase shifts into another light beam to send back to the optical network.

23. The system of claim 22 wherein at least one tunable dispersion compensator is located along a segment of the optical network between the transmitting end and the receiving end.

24. The system of claim 22 wherein the reflective phase optical structure comprises a first phase structure sensitive to a first band.

25. The system of claim 22, further comprising a second reflective phase optical structure sensitive to a second band.

* * * * *